(12) United States Patent
Al-Yami et al.

(10) Patent No.: US 8,118,929 B2
(45) Date of Patent: Feb. 21, 2012

(54) WELL CEMENT FORMULATIONS FOR INCREASED DRILLING HARDNESS

(75) Inventors: Abdullah Saleh Hussain Al-Bari Al-Yami, Dhahran (SA); Scott Steven Jennings, Dhahran (SA); Abdulkarin I. Khafaji, Dhahran (SA); Ahmed Saleh Al-Humaidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 806 days.

(21) Appl. No.: 11/992,184

(22) PCT Filed: Sep. 15, 2006

(86) PCT No.: PCT/US2006/036435
§ 371 (c)(1),
(2), (4) Date: Mar. 13, 2008

(87) PCT Pub. No.: WO2007/035707
PCT Pub. Date: Mar. 29, 2007

(65) Prior Publication Data
US 2009/0260545 A1    Oct. 22, 2009

(30) Foreign Application Priority Data
Sep. 15, 2006   (WO) ............... PCT/US06/36435

(51) Int. Cl.
*C04B 7/00* (2006.01)

(52) U.S. Cl. ......... 106/713; 106/737; 166/292; 700/265

(58) Field of Classification Search ............ 106/713, 106/737; 166/292; 700/265
See application file for complete search history.

(56) References Cited

U.S. PATENT DOCUMENTS

| | | | |
|---|---|---|---|
| 3,654,992 A * | 4/1972 | Harnsberger et al. ......... | 166/281 |
| 4,758,278 A | 7/1988 | Tomic | |
| 5,110,361 A | 5/1992 | Alley et al. | |
| 5,798,151 A | 8/1998 | Andersen et al. | |
| 6,173,778 B1 | 1/2001 | Rae et al. | |
| 6,508,305 B1 | 1/2003 | Brannon et al. | |
| 6,664,215 B1 | 12/2003 | Tomlinson | |
| 2002/0009622 A1 | 1/2002 | Goodson | |
| 2003/0005860 A1 | 1/2003 | Goodson | |
| 2004/0149431 A1 | 8/2004 | Wylie et al. | |
| 2004/0256102 A1 | 12/2004 | Trato | |

OTHER PUBLICATIONS

Int'l. Search Report, Mar. 14, 2007.
Jennings, S.S., Saudi Aramco, "Well Cements That Reduce ROP: (Rate of Penetration)," Copyright 1997, Society of Petroleum Engineers, Inc.

* cited by examiner

*Primary Examiner* — Paul Marcantoni
(74) *Attorney, Agent, or Firm* — Abelman, Frayne & Schwab

(57) ABSTRACT

A well cement composition for plugging a bore at the location for initiating sidetracking to bore a lateral well is formulated as a slurry of hydraulic cement that contains at least two, but preferably all three of the following additives: (1) a source of silicon dioxide, (2) fracturing proppants and (3) an expansion compound selected from the group consisting of 1%-5% crystalline silica and 60%-99% MgO or CaO, and their mixtures.

3 Claims, No Drawings

WELL CEMENT FORMULATIONS FOR INCREASED DRILLING HARDNESS

FIELD OF THE INVENTION

This invention relates to specialized cement compositions of the type placed in oil and gas wells that are used to initiate the drilling of lateral side wells into the surrounding formation. Specifically, the invention relates to cement formulations that exhibit a relatively lower "rate of penetration" (ROP) as compared to the rate of penetration of the same drill through other types of cements conventionally used in completing and sealing hydrocarbon production wells.

BACKGROUND OF THE INVENTION

The drilling of horizontal or other laterally extending well bores to re-enter existing wells is commonly employed to extract additional hydrocarbons from a field in which production has decreased. Horizontal or other lateral drilling operations, which for convenience will be referred to simply as lateral drilling or lateral wells, provide the benefits of improving the depletion and increasing the drainage area of the reservoir, reducing water and gas coning, and improving production rates. Short-radius wells are preferred in many installations.

The initial stage of the drilling of a lateral well, also referred to as "sidetracking", requires that the drill bit pass through an opening in the wall of the casing and penetrate the adjacent formation. As a first step in the sidetrack drilling operation, a section of the well is filled with a cement composition slurry and is allowed to harden, or cure, to form a plug between the casing and the formation.

The ability to successfully initiate a lateral well at the desired position in a vertical well bore is dependent upon the drill bit being deflected, with minimum penetration of the cured cement plug that has been previously pumped into place, and then biting into the formation rock at the desired angle. If the cement is not sufficiently hard, the drill bit will not be deflected from the original well bore, but rather will re-enter the original well bore and will not penetrate the rock formation at the desired angle, if at all. It is not uncommon for several attempts to be required before the sidetrack bore is successfully completed. Thus, a cement of a hardness that is the same as, or as close as possible to that of the formation rock would be highly desirable to improve the success rate and efficiency of initiating lateral well bores.

As used herein, the terms "cement" and "well cement" will be understood to have their art-recognized meanings of a composition that is employed in various aspects of well drilling and completion operations and in which an hydraulic cement, such as Portland cement or other mineral-derived compounds containing lime, alumina and silica constitute one of the ingredients.

A particularly useful measure of a well cement's hardness in the context of lateral well drilling is the rate of penetration (ROP) of a drill bit, typically measured in feet per hour. A method and apparatus for conducting this measurement is described in the Society of Petroleum Engineer's publication identified as SPE 37821, March 1997, authored by S. S. Jennings, the disclosure of which is incorporated herein by reference. Core samples taken from the well bore or a comparable geological formation are also subjected to testing to obtain an ROP value for the purpose of matching, as nearly as possible, the ROP value for a given cured cement composition.

It has been found that increasing compressive strength by reducing water content leads to a cement with low impact strength and low resistance to fracture propagation.

It is known that the addition of ceramic proppants of the type used in formation fracturing will provide a desired increase in the hardness of a well cement. The use of larger ceramic proppants produced lower ROP values, i.e., slower drilling rates. Data reported included the reduction from 6.40 ft/hr with inert ceramic fracturing proppants. A further reduction in the ROP values for well cements to a value that is preferably equal to, or even more preferably, lower than the ROP value of the formation rock to be drilled would be advantageous for use in the art. However, the addition of larger particles and aggregate materials detrimentally affect the cement pumping and handling equipment by blocking valves.

It is therefore an object of the invention to provide a cement composition for use in sidetracking operations for lateral well drilling that, when cured, has a high compressive strength and increased hardness as compared to cements known in the art.

Another object of the invention is to provide a novel combination of additives for formulating hydraulic cement compositions that will permit the user to minimize the difference in the ROP of the well cement plug and the adjacent formation that is to be bored laterally It is another object of the present invention to provide a method for identifying an optimum well cementing formulation for use in initiating a lateral well drilling operation to facilitate penetration of a specified rock formation.

SUMMARY OF THE INVENTION

The above objects and other advantages are achieved by the cement compositions of the invention that, when cured, have a high compressive strength and that are very hard as measured by the rate of penetration drilling test standard. The novel cement compositions of the invention includes the following principal additives to increase the hardness of the cured composition:
   a. a silicon dioxide source, such as a silica flour or sand;
   b. one or more fracturing proppants; and
   c. an expansion compound selected from the group consisting of 1%-5% crystalline silica and 60-99% MgO or CaO, and mixtures thereof.

The novel composition can be formulated using any hydraulic cement that is available at the well site. Any of the API and ACTM types of cement can be utilized.

The proppants preferred for use in the practice of the invention are of a size range passing through a sieve with a mesh size in the range of from 10 to 16 and held on a mesh of 18 to 30. A hard inorganic material is preferred. Ceramic proppants are most preferred due to their hardness, but other proppant materials can also be used, depending on their availability and cost considerations.

The silicon dioxide source can be sand or silica flour. The silica flour is formed of from 60% to 90% crystalline silica or quartz. It is not soluble in water.

It is to be understood that in all of the formulations described, the final composition must be pumpable by conventional equipment.

DETAILED DESCRIPTION OF THE INVENTION

The invention will be further described with reference to the specific examples and detailed formulations that appear below.

In one preferred embodiment, the composition of the well cement of the invention comprises the following ingredients, where the percentages of the additives recited here and throughout the specification and claims are weight percentages based on the starting weight of the dry hydraulic cement used:

a. hydraulic cement,
b. water: 18%-200%,
c. silicon dioxide source: 10%-250%,
d. proppant: 10%-400% and
e. expansion additive: 0.5%-10%.

The cement composition is also preferably formulated with other secondary additives that are known in the art for use in well bore cements to facilitate lateral drilling. The additives can include, for example, friction reducing compounds, such as diatomaceous earth; sulfanilic acid salts; silica; setting time retardant compounds, such as lignin/sulfonates (or lignosulfonates); and anti-settling compounds, such as glucoside polymers and crystalline silica.

A particularly preferred embodiment of the invention is a well cement composition that includes an anti-settling additive and the three principal additives, i.e., a silicon dioxide source, proppant and an expansion additive.

The following general formulation for a well cement composition incorporating the three principal additives of the invention is representative of well cement compositions that can be utilized under a variety of conditions. The selection of the particular combination of secondary additives, as well as the respective amount of each of the additives, is within the ordinary skill of the art. All percentage values are based on the weight of the dry hydraulic cement and appear as ranges directly after the additive. The commercial sources for these secondary additives are also well known in the art and they will be recognized as conventional ingredients that have been in widespread use in the field.

Hydraulic cement
Water: 18%-200%
Silicon dioxide source: 10%-250%
Hematite (iron oxide) or manganese tetraoxide: 0%-200%
Fiber: 0%-200%
Fluid loss additive: 0%-2%
Retarder additives: 0%-10%
Friction reducer dispersant additive: 0%-2.5%
Latex additive: 0%-50%
Latex stabilizer additive: 0%-4%
Anti-settling additive: 0%-2%
Accelerator additive: 0%-5%
Anti-foaming additive: 0%-0.1%
Fumed silica: 0%-50%

The amount of each of the additives can be varied and adjusted in order to provide a cured cement having a desired ROP that corresponds to the ROP of the particular rock formation that is to be drilled laterally. As will be apparent to those of ordinary skill in the art, the selection and amount of the respective additives is also based upon local conditions and requirements. The preparation and testing of various well cement formulations prepared in accordance with the present description and the examples set forth below to obtain the ROP value is well within the ordinary skill of the art.

As explained above, any type of hydraulic cement can be used in preparing the well cement compositions of the invention. While the preferred embodiment of the cement composition of the invention includes all three of the principal additives in the classes of a silicon dioxide source, a fracturing proppant and an expansion compound, useful cement compositions exhibiting increased hardness, i.e., relatively low ROP values as compared to conventional well cements, can be obtained by using any two of the three principal additives. The following examples are illustrative of this aspect of the invention.

EXAMPLE 1

Hydraulic cement
Water: 18%-200%
Expansion additive: 0.5%-10%
Silicon dioxide source: 10%-250%

EXAMPLE 2

Hydraulic cement
Water: 18%-200%
Expansion additive: 0.5%-10%
Proppant: 10%-400%

EXAMPLE 3

Hydraulic cement
Water: 18%-200%
Proppant: 10%-400%
Silicon dioxide source: 10%-250%

However, the preferred composition, and the one that provides the most satisfactory results for initiating lateral wells is represented by the following formulation that comprises all three of the principal additives:

EXAMPLE 4

Hydraulic cement
Water: 18%-200%
Expansion additive: 0.5%-10%
Proppant: 10%-400%
Silicon dioxide source: 10%-250%

It will also be understood by those of ordinary skill in the art that more than one of each of the specified types or classes of additives can be used in formulating a composition to achieve the desired ROP value. In each instance, it is to be understood that at least one of each such additive, if present, will be used.

In the practice of the method of the invention the well cement composition is preferably prepared as follows:

a. the dry hydraulic cement is mixed with the silicon dioxide source and the expansion additive(s), if present;
b. the secondary additives are mixed with the water;
c. the dry mixture of step (a) is added to the aqueous composition of step (b); and
d. the proppant, if used, is added to the composition of step (c) to form a pumpable slurry.

The cement slurry is then transferred for pumping into the well bore using conventional equipment.

In a further aspect of the method of the invention, a table or other collection of ROP values for a corresponding number of cured cement formulations that have been prepared in accordance with the present invention and subjected to testing is assembled and maintained in print or electronic form for use as a reference or guide for the selection of a cement composition for a new well site At such time as a particular well or field is to be subjected to lateral well drilling, ROP values are obtained from retained or new core samples of rock at the depth and location where the sidetrack drilling for the lateral well is to be initiated. A cement composition can then be selected from the collected ROP values in the table that corresponds as closely as possible to the ROP value of the rock formation surrounding the well bore at the sidetracking position.

In a preferred embodiment, the database of the ROP values for the compositions of the invention are maintained in a programmed general purpose computer. When the ROP value for the rock formation to be laterally drilled is identified or determined, that value is entered for comparison to the stored ROP values and the display and/or printing of one of more compositions meeting the programmed requirements.

Thus, the invention comprehends a method of formulating a cement composition for use in forming a cured cement plug at a predetermined depth to initiate a sidetrack well bore to provide a rate of penetration (ROP) value that is comparable to the ROP of the adjacent rock formation to be bored, where the method comprises the steps of:

a. determining and recording the ROP value for the rock formation at the predetermined drilling position;

b. comparing the ROP of the rock formation determined in step (a) to a table containing a plurality of different ROP test values obtained by testing cured cement compositions that included the following additives to increase the hardness of the cured cement:

i. silica flour;

ii. fracturing proppants; and iii. expansion compounds selected from the group consisting of 1%-5% crystalline silica and 60-99% MgO or CaO, and mixtures thereof;

c. identifying an ROP test value for a cement composition that is the same as, greater than, or if neither is present in the table, the closest lesser value to the ROP of the rock formation to be drilled; and d. selecting and preparing a cement composition corresponding to the ROP test value identified in step (c) for addition to the well bore.

In the following Table, the term "CL-G" refers to a class G cement and the Time, recorded in minutes, is that required to complete the drilling of well cement samples of equal thickness formulated with the additives as indicated in the adjacent line. In this series of samples, the greater the value in the Time column, the relatively harder is the well cement, as measured by the ROP test described in the SPE 37821 (1997) publication referenced above. All percentages are based on the weight of cement utilized in the batch.

TABLE

| Sample No. | Composition | ROP (Min.) |
|---|---|---|
| R | Reference core sample from gas well formation | 29.3 |
| A | CL-G cement + 44% water | 1.75 |
| B | CL-G cement + 1% expansion additive + 100% silicon dioxide source + 44% water | 10.6 |
| C | CL-G cement + 1% expansion additive + 100% proppant + 44% water | 7.1 |
| D | CL-G cement + 50% silicon dioxide source + 50% proppant + 44% water | 14.9 |
| E | CL-G cement + 1% expansion additive + 100% silicon dioxide source + 100% Proppant + 44% water | 28.5 |

The following are representative of preferred embodiments of formulations for well cement compositions. Example 5 contains all three of the principal additives and Example 6 contains two of the principal additives.

EXAMPLE 5

Hydraulic cement
Water: 94.73%
Expansion additive: 1%
Proppant: 100%
Silicon dioxide source: 100%
Fluid loss additives (1): 0.45%
Fluid loss additive (2): 0.3%
Retarder additive: 1%
Friction reducer additive: 0.5%
Non foam additive: 0.001%

EXAMPLE 6

Hydraulic cement
Water: 94.73%
Proppant: 100%
Silicon dioxide source: 100%
Fluid loss additives (1): 0.45%
Fluid loss additive (2): 0.3%
Retarder additive: 1%
Friction reducing additive: 0.5%
Anti-foaming additive: 0.001%

The invention has been described with reference to a number of examples of preferred, but non-limiting embodiments. Other variations will be apparent to those of ordinary skill in the art and the scope of the invention is to be determined with reference to the claims that follow.

We claim:

1. A method of formulating a well cement composition containing hydraulic cement for use in forming a cured cement plug at a target position in a well bore to provide a rate of penetration (ROP) value for the cement plug that is comparable to the ROP of the adjacent rock formation, the method comprising the steps of:

a. determining and recording the ROP value for the rock formation at the target well depth;

b. comparing the value of the ROP of the rock formation from (a) to a table of ROP test values obtained by testing cured cement compositions that included the following additives to increase the hardness of the cured cement:

i. from 10% to 250%, by weight, based on the dry weight of the hydraulic cement, of a silicon dioxide source selected from the group consisting of silica flour and sand;

ii. from 10 to 400%, by weight, based on the dry weight of the hydraulic cement, of a fracturing proppant, selected from the group consisting of a ceramic, iron oxide and manganese tetraoxide proppants;

iii. an expansion compound selected from the group consisting of from 1% to 10% crystalline silica and 60-99% MgO or CaO, based on the dry weight of the hydraulic cement, and mixtures thereof;

c. identifying an ROP test value for a cement composition that is the same as, greater than, or if neither is present in the table, the closest lesser value to the ROP of the rock formation that is to be drilled; and d. selecting and preparing a well cement composition corresponding to the ROP test value identified in step (c).

2. The method of claim 1 in which the ROP value for the rock formation is determined by drilling a core sample from the same or a comparable formation.

3. The method of claim 1 in which the value of the ROP for the rock formation is entered in a programmed processor of a general purpose computer for comparison to a plurality of ROP values for well cement samples stored in the memory of the computer, and displaying one or more compositions of well cements.

* * * * *